United States Patent [19]

Tucek

[11] Patent Number: 4,500,139
[45] Date of Patent: Feb. 19, 1985

[54] CRAWLER TRACK SUPPORT SYSTEM WITH VERTICALLY EXTENSIBLE CENTRA ROLLERS

[75] Inventor: Frank J. Tucek, Wausau, Wis.

[73] Assignee: J. I. Case Company, Racine, Wis.

[21] Appl. No.: 461,862

[22] Filed: Jan. 28, 1983

[51] Int. Cl.³ ............................................. B62D 55/14
[52] U.S. Cl. ......................................... 305/10; 305/27
[58] Field of Search .............................. 305/10, 27, 28

[56] References Cited

U.S. PATENT DOCUMENTS

| | | |
|---|---|---|
| 1,568,241 | 1/1926 | Rimailho . |
| 2,277,855 | 3/1942 | Mercier ............................ 305/27 X |
| 2,860,715 | 11/1958 | Bouffort ........................... 305/27 X |
| 3,183,016 | 5/1965 | Gustafsson . |
| 3,484,139 | 12/1969 | Danner . |
| 3,913,987 | 10/1975 | Baldwin et al. . |
| 4,325,443 | 4/1982 | Fischer ............................ 305/27 X |

FOREIGN PATENT DOCUMENTS

| | | | |
|---|---|---|---|
| 40225 | 10/1926 | Denmark .............................. 305/27 |
| 44534 | 2/1935. | France ................................. 305/27 |
| 412839 | 11/1933 | United Kingdom ................. 305/10 |

Primary Examiner—David A. Scherbel
Attorney, Agent, or Firm—Dressler, Goldsmith, Shore, Sutker & Milnamow, Ltd.

[57] ABSTRACT

A crawler track support system is disclosed which is particularly suited for embodiment in a material handling implement, such as a crawler excavator. The support system permits selective alteration of the length of the ground-engaging portion of a crawler track, thus permitting maximum ground contact which is necessary for traction and support, and also permitting reduced track ground contact for improved mobility. Significantly, the present support system is very straightforward in construction for economical manufacture and reliable operation. If desired, the present support system can be adapted to provide shock absorption for the implement, which can be particularly desirable when traveling at relatively high speeds.

6 Claims, 5 Drawing Figures

U.S. Patent  Feb. 19, 1985  4,500,139
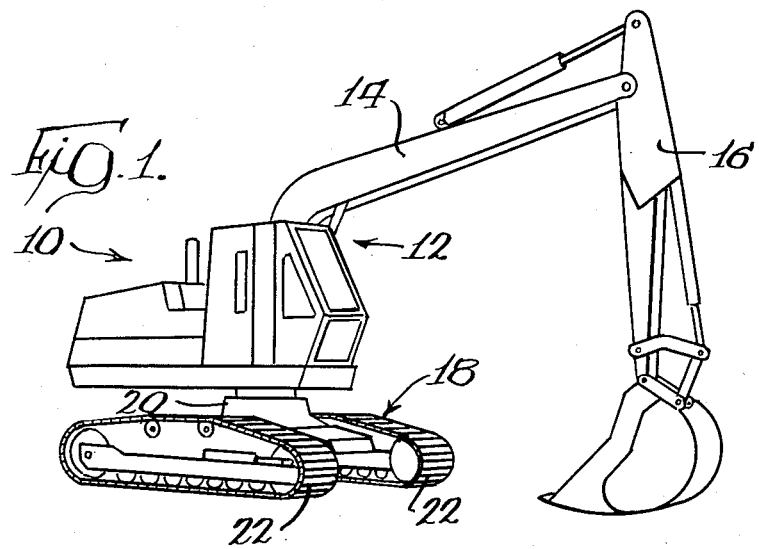
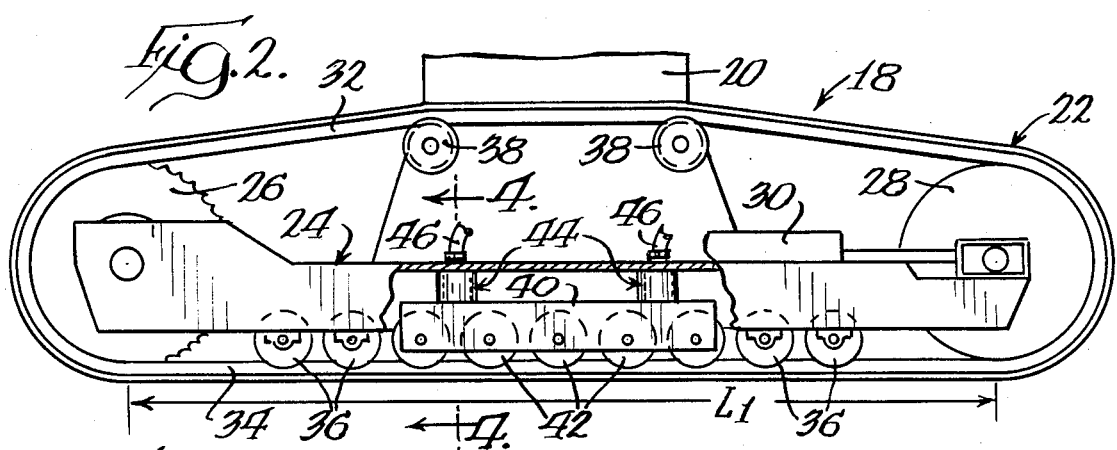
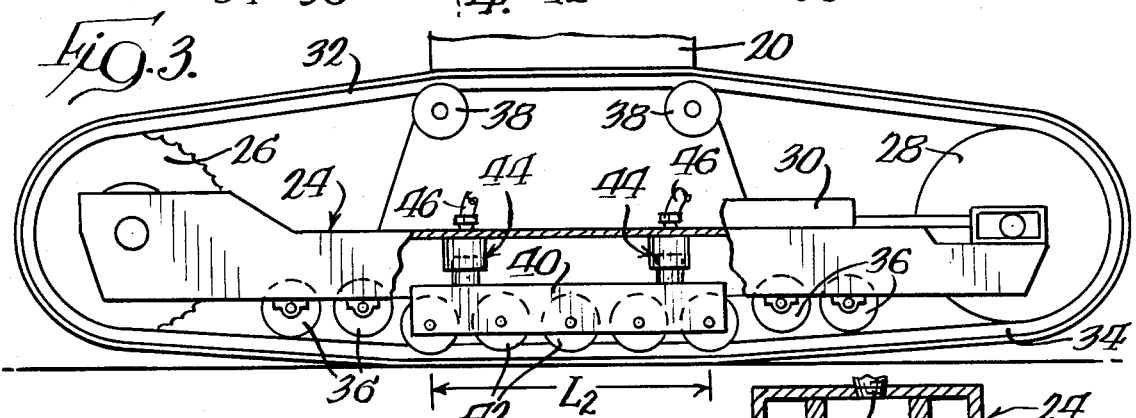
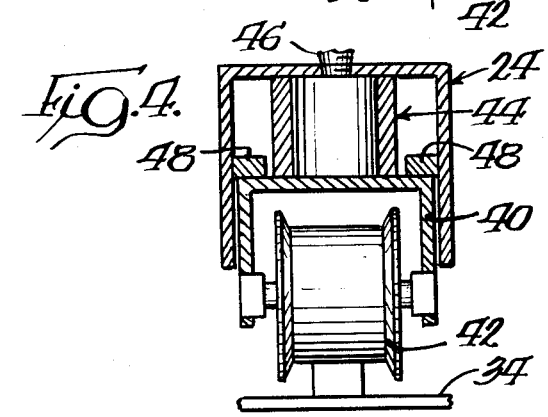
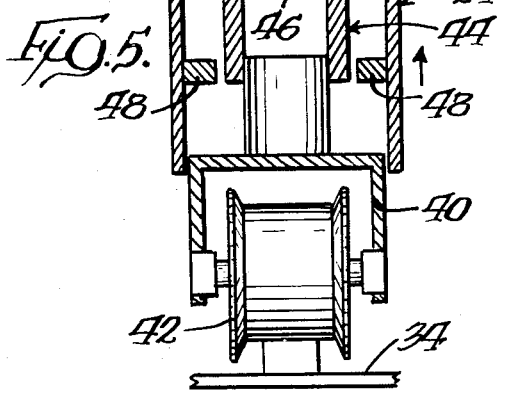

CRAWLER TRACK SUPPORT SYSTEM WITH VERTICALLY EXTENSIBLE CENTRA ROLLERS

FIELD OF THE INVENTION

The present invention relates generally to arrangements for mounting endless crawler tracks on an excavator or the like, and more particularly to a crawler track support system which permits selective alteration of the length of the ground-engaging portion of the crawler track.

BACKGROUND OF THE INVENTION

For material handling equipment which is supported and driven by endless crawler drive tracks, the length of the ground-engaging portion of the lower run of the crawler tracks has a significant effect on the performance characteristics of the equipment. Typically, the maximum length of the ground-engaging portion of a crawler track generally corresponds to the distance between an idler roller and a drive sprocket about which the endless track extends. In many situations, it is desirable to have this maximum length of the track in engagement with the ground. Maximum ground contact desirably provides necessary support and traction for a piece of equipment (and relatively low per square inch ground pressure) in soft soil conditions. The usual track support arrangement, including the typical rigid mounting of the track-engaging rollers of the crawler undercarriage, desirably provides relatively good stability for the machine supported by the crawler tracks.

In contrast, maximum track engagement with the ground can be undesirable under some circumstances, particularly where mobility is needed. Based on available horsepower, relatively low travel speed and high bar pull are necessary to make turns when track contact is relatively large (draw bar pull being an essentially linear function of track contact area). This can be undesirable when relatively high travel speed is needed, such as for driving between different areas of a job site. Additionally, maximum speed is also somewhat restricted because the typical crawler track mounting arrangement is rigid and provides no cushioning or shock absorption for either the machine, or the person operating it. Further, the typical crawler track mounting arrangement is not particularly well suited for traveling over small objects or obstacles at relatively high travel speeds with lower draw bar pull.

In view of the above, an arrangement for selectively altering the length of the ground-engaging portion of a crawler track is very desirable, and enhances the versatility and efficiency of material handling equipment. By permitting a relatively shorter length of an implement's crawler tracks to be in contact with the ground, relatively less draw bar pull is required for turning, thus enhancing maneuverability. Further, the requirement of less draw bar pull permits the available horsepower of an implement to be used for relatively higher travel speeds. Additionally, improved shock absorption can be provided if the arrangement for altering the ground-engaging length of a crawler track is provided with energy absorption capability. Finally, a more favorable angle of approach with respect to obstacles can be obtained, thereby permitting travel over objects with less draw bar pull, and thus higher travel speeds.

While the virtues of an arrangement for changing the portion of a crawler track which contacts the ground are apparent, such an arrangement must be straightforward and reliable in construction if the virtues are to outweigh problems of excessive maintenance and installation expense. Because material handling equipment is ordinarily subjected to harsh operating conditions, components of the equipment must operate reliably without excessive service requirements. At the same time, reliability cannot be obtained at the expense of economic fabrication if an arrangement is to be commercially viable.

Arrangements are known for altering the ground-engaging portion of a crawler track, yet none have been widely commercially employed, particularly in material handling equipment. For example, U.S. Pat. No. 2,860,715, to Bouffort, illustrates an adjustable arrangement for endless tracks which is relatively complicated, and which has not found ready commercial acceptance. Additionally, the arrangement illustrated in this patent is not particularly suited for use in material handling equipment since the arrangement does not permit the entire length of the lower run of a crawler track to engage the ground. As noted above, maximum ground contact is necessary for a crawler-supported material handling device to properly and efficiently perform material handling functions.

Because of the advantages which selective alteration of the length of the ground-engaging portion of a crawler track provides, it is desirable to provide an arrangement for this purpose so long as it is straightforward in construction for reliability and ease of manufacture. Additional advantages can be obtained with such an arrangement if track shock absorption is provided. The provision of such an arrangement for material handling equipment desirably enhances efficiency and cost-effectiveness of material handling operations.

SUMMARY OF THE INVENTION

In accordance with the present invention, a crawler track support system is disclosed which is particularly suited for embodiment in a material handling equipment. The system permits the length of the ground-engaging portion of a crawler track to be selectively altered. The system preferably includes an arrangement for selectively, relatively vertically reorienting a group of track-engaging rollers which are adapted to engage the upwardly facing surface of the lower run of a crawler track.

The present support system includes a crawler track undercarriage including a longitudinally extending frame member, and a drive sprocket and an idler sprocket rotatably mounted at respective opposite ends of the undercarriage frame member. The endless crawler track extends about and is mounted on the drive sprocket and idler roller, to thus define upper and lower runs of the crawler track. The maximum length of the ground-engaging portion of the lower run of the crawler track generally corresponds to the distance between the rotational axes of the drive sprocket and idler roller.

In order to further support the crawler undercarriage on the endless crawler track, a relatively vertically movable roller support member is preferably provided for carrying a plurality of commonly mounted, longitudinally spaced track-engaging rollers. The roller support member is positioned generally beneath and supports the longitudinal frame member of the crawler undercarriage, with the track-engaging rollers adapted to engage the upwardly facing surface of the lower run of the crawler track.

In order to provide selective positioning of the roller support member relative to the undercarriage frame member, and thereby selectively alter the length of the ground-engaging portion of the crawler track, fluid actuated motor means, preferably comprising vertically extensible fluid actuators, are operatively associated with the undercarriage frame member and the roller support member, preferably by disposition of the actuators in between the frame member and the roller support member. The fluid actuators provide relative movement of the frame member with respect to the roller support member between a first, retracted position of the roller support member, and a second, extended position of the roller support member to thereby alter the length of the portion of the track in contact with the ground. In the retracted position of the roller support member, the length of the ground-engaging portion of the crawler track generally corresponds to the distance between the rotational axes of the drive sprocket and idler roller, i.e., maximum ground contact is provided. In the extended portion of the roller support member, the length of the ground-engaging portion of the crawler track generally corresponds to the distance between the rotational axes of the longitudinally endmost ones of the track-engaging rollers carried by the roller support member.

As will be appreciated from the following detailed description, the present support system is straightforward in construction for economical fabrication and service reliability. In the preferred embodiment, positive stops are provided on the undercarriage frame member which positively engage the roller support member in the retracted position thereof. In this manner, vertical loads on the fluid actuators of the system are substantially eliminated when the roller support member is in its retracted position, and the undercarriage frame member is rigidly positioned upon the roller support member.

Depending upon the desired characteristics for the track support system, the fluid actuators of the system may be either hydraulically or pneumatically operated. If hydraulically operated, the actuators provide an essentially rigid interface between the roller support member and the undercarriage frame member, even in the relatively extended position of the roller support member. In contrast, pneumatic actuation of the fluid actuators desirably permits them to function as shock absorbers to provide resilient cushioning between the undercarriage frame member and the roller support member when the roller support member is in its extended position.

Numerous other features and advantages of the present invention will become readily apparent from the following detailed description of the invention and embodiment thereof, from the claims and from the accompanying drawings.

BRIEF DESCRIPTION OF THE DRAWINGS

FIG. 1 is a front perspective view of a crawler track supported excavator embodying the present invention;

FIG. 2 is a side elevational view of one of the crawler tracks of the excavator shown in FIG. 1 illustrating the present track support system positioned to provide maximum contact of the crawler track with the ground;

FIG. 3 is a view similar to FIG. 2 illustrating the present crawler track support system positioned to provide reduced contact of the crawler track with the ground;

FIG. 4 is a view taken generally along lines 4—4 of FIG. 2 illustrating the present track support system positioned for maximum crawler track ground engagement; and FIG. 5 is a view similar to FIG. 4 illustrating the present crawler track support system positioned for providing reduced crawler track ground engagement.

DETAILED DESCRIPTION

While the present invention is susceptible of embodiment in various forms, there is shown in the drawings and will hereinafter be described a presently preferred embodiment with the understanding that the present disclosure is to be considered as an exemplification of the principals of the invention and is not intended to limit the invention to the specific embodiment illustrated.

With reference now to FIG. 1, therein is illustrated an excavator 10 embodying the present crawler track support system. As will be appreciated, excavator 10 typifies the type of material handling implement which employs endless crawler tracks for propulsion. While the present invention is described in association with excavator 10, it will be recognized that the present invention is readily adaptable for other types of implements having crawler track drives, such as crawler tractors and the like.

Excavator 10 includes a superstructure, generally designated 12, typically including an operator's control area and a housing for an internal combustion engine and other components of the excavator. The excavator includes an articulable boom 14 and dipper arm 16 in order to perform material handling functions.

To provide the necessary mobility for excavator 10, superstructure 12 is supported upon a crawler undercarriage 18 by a swivel 20. Swivel 20 permits superstructure 12 to rotate about a vertically oriented axis with respect to undercarriage 18, and ordinarily permits a full 360 degrees of relative rotation therebetween. Undercarriage 18 includes a pair of transversely spaced, endless crawler tracks 22. Crawler tracks 22 may be of a known construction, and typically include a plurality of pivotally interconnected plate-like elements (sometimes referred to as grousers).

With reference now to FIG. 2, the crawler track support system of the present invention will be described with respect to one of crawler tracks 22, with the understanding that it is contemplated that the present support system is provided for each of crawler tracks 22 of excavator 10. Undercarriage 18 includes a longitudinally extending frame member 24. A crawler track drive sprocket 26 and a track idler roller 28 are rotatably mounted on frame member 24 at respective opposite ends thereof. Ordinarily, drive sprocket 26 is suitably powered in order to drive the associated crawler track 22, while idler roller 28 guides and carries the crawler track. A recoil cylinder 30 is illustrated in operative association with idler roller 28, with the recoil cylinder permitting longitudinal movement of idler roller 28 to provide shock absorption for the track and adjustment of track tension in a known and conventional manner.

As shown, crawler track 22 extends about and is mounted on drive sprocket 26 and idler roller 28 so as to define upper and lower runs for the crawler track, respectively designated 32 and 34. The length of lower run 34 of crawler track 22 which contacts the ground provides a surface which supports undercarriage 18, and in turn excavator 10. To this end, track-engaging rollers are provided for engaging the upwardly facing surface of the lower run 34 of the crawler track and thus provide an interface between the crawler track and the undercarriage. A plurality of track-engaging rollers 36 are rotatably mounted on undercarriage frame member 24 to provide the needed support for the crawler undercarriage on the crawler track. A pair of carrier rollers 38 are typically provided for supporting the upper run 32 of crawler track 22 on the undercarriage 18.

As is evident from FIG. 2, the maximum ground-engaging length of crawler track 22 generally corresponds to the distance between the rotational axes of drive sprocket 26 and idler roller 28, and is designated $L_1$. As previously discussed, maximum ground engagement of the crawler track is needed for efficiently performing many material handling operations, particularly those in which good traction and low ground contact pressure are desired.

In accordance with the present invention, selective alteration in the length of the ground-engaging portion of crawler track 22 is provided by a relatively vertically movable roller support member 40. Roller support member 40 is generally centrally disposed with respect to drive sprocket 22 and idler roller 28 beneath frame member 24, and preferably carries a plurality of longitudinally spaced, track-engaging rollers 42. Rollers 42 are adapted to engage the upwardly facing surface of lower run 34 of the crawler track in a manner akin to rollers 36, but rollers 42 are vertically movable with respect to frame member 24 attendant to relative vertical movement of roller support member 40 with respect to the frame member.

Selective relative positioning between frame member 24 and roller support member 40 is preferably provided by a pair of longitudinally spaced, vertically extensible fluid actuators 44. Significantly, fluid actuators 44 are operatively disposed between undercarriage frame member 24 and roller support member 40 to permit the desired selective relative vertical positioning of roller support member 40 with respect to frame member 24 in a straightforward and efficient fashion. As further illustrated in FIGS. 4 and 5, fluid actuators 40 are preferably in the nature of fluid extensible rams, with one of the piston and cylinder of each actuator affixed to one of frame member 24 and roller support member 40, and with the other of the piston and cylinder of each actuator affixed to the other of frame member 24 and roller support member 40.

Pressurized fluid for operation of fluid actuators 44 is provided via suitable fluid conduits 46, which are supplied with pressurized fluid from an associated source. A suitable source of pressurized fluid is typically available on an excavator since many of its components are fluid-actuated.

As will be appreciated, selective relative vertical positioning of roller support member 40 with respect to frame member 24 is provided by selective fluid pressurization of fluid actuators 44. Thus, pressurization of actuators 44 acts to relatively move frame member 24 with respect to roller support member 40. The roller support member 40 is positionable in a first, relatively retracted position (FIGS. 2 and 4) and a second, extended position (FIGS. 3 and 5). By extension of actuators 44, the length of the ground-engaging portion of crawler track 22 can be significantly reduced. Specifically, the ground-engaging portion of the track is altered from length $L_1$ when roller support member 40 is in its retracted position, to length $L_2$ when roller support member 40 is in its extended position (FIGS. 2 and 3, respectively). When roller support member 40 is in this relatively extended position, the length $L_2$ of the ground-engaging portion of the lower run of crawler track 22 generally corresponds to the distance between the rotational axes of the longitudinally endmost ones of track-engaging rollers 42 carried by roller support member 40.

Significantly, the desirable results obtained by reducing the length of the ground-engaging portion of crawler track 22 are achieved with a relatively small amount of relative vertical movement between frame member 24 and roller support member 40, typically no more than several inches. Because the relative repositioning of frame member 24 and roller support member 40 need not be large, it is ordinarily unnecessary to adjust the tension or length of crawler track 22, since crawler tracks of this nature are usually operated with sufficient slack to accommodate the relative repositioning. If desired, additional slack in crawler track 22 can be provided by suitably adjusting recoil cylinder 30, thus moving idler roller 28 inwardly of frame member 24.

As will be recognized, pressurization of actuators 44 will ordinarily lift frame member 24 (and other portions of undercarriage 18) upwardly with respect to roller support member 40, since the roller support member will usually be relatively vertically fixed with respect to the lower run 34 of crawler 22 and the ground. While relative repositioning of frame member 24 and roller support member 40 can be similarly achieved by the provision of a suitable actuator-operated linkage arrangement, the embodiment illustrated is preferable for its straightforward construction which affords ease of fabrication and reliability. FIGS. 4 and 5 illustrate the desired protection which is provided for actuators 44 by their operative disposition generally within frame member 24 between the frame member and roller support member 40. The typical channel-like construction of frame member 24 permits actuators 44 to be readily positioned in this manner to limit their exposure to the rigorous operating conditions to which material handling equipment is typically subjected.

FIGS. 4 and 5 further illustrate the provision of positive stops 48 on frame member 24. Stops 48 are adapted to positively engage and bear against roller support member 40 when the roller support member is in its retracted position. In this way, the vertical load on actuators 44 is substantially eliminated when roller support member 40 is in its retracted position, and the frame member 24 is rigidly positioned upon roller support member 40 for stability of the excavator.

Depending upon the desired characteristics for the present support system, fluid actuators 44 may be either hydraulically or pneumatically operated. If hydraulically operated, the fluid actuators provide an essentially rigid member between undercarriage frame member 24 and roller support member 40 when the roller support member is in its extended position. In contrast, pneumatic pressurization of fluid actuators 44 (or actuation with a like compressible fluid) permits the actuators to function as shock absorbers, thus providing resilient cushioning between frame member 24 and roller support member 40. Such shock absorption can be particularly desirable when operating excavator 10 at relatively high travel speeds while roller support member 40 is in its extended position and length $L_2$ of crawler track 22 is in contact with the ground. As will be recognized, fluid actuators 44 may comprise suitable air bladders or the like if shock absorption is desired. Regardless of whether actuators 44 are hydraulically or pneumatically operated, each of the actuators is preferably single-acting, again for reliability and ease of fabrication. Thus, fluid pressurization acts to extend the actuators 44, while release of fluid pressure causes the actuators to retract as the weight of the machine bears against roller support member 40.

From the foregoing, it will be observed that numerous variations and modifications may be effected without departing from the true spirit and scope of the concept of the present invention. It will be understood that no limitation with respect to the specific apparatus illustrated herein is intended or should be inferred. It is, of course, intended to cover by the appended claims all such modifications as fall within the scope of the claims.

What is claimed is:

1. A support system for an endless crawler track for selectively altering the length of the ground-engaging portion of the track, comprising:
   an undercarriage including a longitudinally extending frame member, and a track drive sprocket roller and a track idler roller rotatably mounted at respective opposite ends of said frame member, said crawler track being mounted on and extending about said drive sprocket and said idler roller to define upper and lower runs of said track;
   a plurality of track-engaging rollers mounted in longitudinally spaced relation on said longitudinally extending frame member, said track-engaging rollers being adapted to engage the upwardly-facing surface of the lower run of said crawler track;
   relatively vertically positionable roller support means mounted on and positioned generally beneath said longitudinally extending frame members, at least one-half of said plurality of track-engaging rollers being mounted on said frame member by common mounting on said roller support means for relative vertical movement therewith;
   fluid actuated motor means operatively disposed between said longitudinally extending frame member and said roller support means for providing relative vertical movement of said roller support means and said ones of said track-engaging rollers mounted thereon with respect to said frame member between a first, retracted position and a second extended position, wherein in said retracted position the length of the ground-engaging portion of the lower run of said crawler track generally corresponds to the distance between the respective rotational axes of said drive sprocket and said idler roller, and wherein in said extended position the length of the ground-engaging portion of the lower run of said track generally corresponds to the distance between the respective rotational axes of the two longitudinally endmost ones of the ones of said track-engaging rollers mounted on said roller support means; and
   means on said longitudinally extending frame member for positively engaging said roller support means when said roller support means are in said retracted position to substantially eliminate the vertical load carried by said motor means.

2. The crawler track support system in accordance with claim 1, wherein
   said motor means comprises pneumatically actuated motor means to provide resilient cushioning between said frame member and said roller support means when said roller support means are in said extended position.

3. The crawler track support system of claim 1, wherein
   said motor means comprises at least two vertically extensible fluid actuators operatively positioned between said frame member and said roller support means.

4. A support system for a pair of laterally spaced endless crawler tracks for selectively altering the length of the ground-engaging portion of each said track, comprising:
   a crawler undercarriage including a pair of laterally spaced, longitudinally extending frame members, and a pair of track drive sprockets and a pair of track idler rollers wherein each said drive sprocket and each said idler roller is rotatably mounted at respective opposite ends of a respective one of said frame members, each said crawler track being mounted on and extending about respective ones of said drive sprockets and said idler rollers to define upper and lower runs of each said crawler track;
   a plurality of track-engaging rollers rotatably mounted in longitudinally spaced relation on each of said longitudinally extending frame members, said track-engaging rollers being adopted to engage the upwardly-facing surfaces of the lower runs of said crawler tracks;
   a pair of relatively vertically movable roller support members respectively mounted on and positioned generally beneath said frame members, at least one-half of said track-engaging rollers associated with each respective one of said crawler tracks being mounted on the respective one of said frame members by common mounting on the respective one of said roller support members for relatively vertical movement therewith; and
   fluid actuated motor means comprising first and second pairs of vertically extensible fluid actuators, each pair of fluid actuators being operatively positioned in longitudinally spaced relation between one of said roller support members and the respective one of said frame members, said fluid actuator motor means being operable for relatively moving each said roller support member and the ones of the track-engaging rollers mounted thereon between a first retracted position and a second extended position, wherein in said retracted position the length of the ground-engaging portion of the associated one of said crawler tracks generally corresponds to the distance between the respective rotational axes of the ones of said drive sprockets and said idler rollers about which that one of said crawler tracks extends, and wherein in said extended position the length of the ground-engaging portion of the associated one of said crawler tracks generally corresponds to the distance between the rotational axes of the longitudinally endmost ones of the ones of said track-engaging rollers commonly mounted on the roller support member, said roller support member being positionable together in said extended position to permit selective simultaneous reduction in the length of the ground-engaging portions of said crawler tracks, wherein said undercarriage frame members each include generally downwardly open channel portions, said first and second pairs of fluid actuators being respectively positioned generally within said channel portions of said frame members.

5. The crawler track support system in accordance with claim 4, wherein each said frame member includes means for positively engaging the respective one of said roller support members in the retracted position thereof to substantially eliminate the vertical load carried by the associated pair of said vertically extensible fluid actuators.

6. The crawler track support system in accordance with claim 4, wherein said fluid actuators comprise pneumatic fluid actuators to provide resilient pneumatic cushioning between said frame members in the extended position thereof.

* * * * *

UNITED STATES PATENT AND TRADEMARK OFFICE
CERTIFICATE OF CORRECTION

PATENT NO. : 4,500,139

DATED : February 19, 1985

INVENTOR(S) : Frank J. Tucek

It is certified that error appears in the above-identified patent and that said Letters Patent is hereby corrected as shown below:

In the Title, the word "CENTRA" should be "CENTRAL".

In column 1, line 37, the word "draw" is omitted before the word "bar".

In column 2, line 41, the word "equipment" should be "implement".

In column 3, line 23, the word "portion" should be "position".

Signed and Sealed this

Twenty-third Day of July 1985

[SEAL]

Attest:

DONALD J. QUIGG

Attesting Officer

Acting Commissioner of Patents and Trademarks